(12) United States Patent
Geiszler (10) Patent No.: US 9,876,386 B2
(45) Date of Patent: Jan. 23, 2018

(54) WIRELESSLY POWERED DOOR LOCK SYSTEMS AND METHODS

(71) Applicant: FP Wireless LLC, San Jose, CA (US)

(72) Inventor: Theodore D. Geiszler, Monte Sereno, CA (US)

(73) Assignee: FP Wireless LLC, San Jose, CA (US)

( * ) Notice: Subject to any disclaimer, the term of this patent is extended or adjusted under 35 U.S.C. 154(b) by 78 days.

(21) Appl. No.: 15/008,159

(22) Filed: Jan. 27, 2016

(65) Prior Publication Data

US 2016/0322855 A1 Nov. 3, 2016

Related U.S. Application Data

(63) Continuation-in-part of application No. 14/699,867, filed on Apr. 29, 2015, now abandoned.

(51) Int. Cl.
*H01M 10/44* (2006.01)
*H01M 10/46* (2006.01)
*H02J 7/02* (2016.01)
*H02J 50/10* (2016.01)
*H02J 50/80* (2016.01)

(52) U.S. Cl.
CPC .............. *H02J 7/025* (2013.01); *H02J 50/10* (2016.02); *H02J 50/80* (2016.02)

(58) Field of Classification Search
CPC .......... H02J 7/025; H02J 5/005; H02J 7/0042; H02J 7/355
USPC ........... 320/108, 114; 307/104; 70/277, 271, 70/431; 292/1
See application file for complete search history.

(56) References Cited

U.S. PATENT DOCUMENTS

| | | |
|---|---|---|
| 3,938,018 A | 2/1976 | Dahl |
| 5,733,313 A | 3/1998 | Barreras, Sr. et al. |
| 7,113,070 B2 | 9/2006 | Deng et al. |
| 8,294,302 B2 | 10/2012 | Peabody et al. |
| 8,354,914 B2 | 1/2013 | Buckingham et al. |

(Continued)

FOREIGN PATENT DOCUMENTS

| | | |
|---|---|---|
| AU | 1998052770 | 7/1998 |
| CN | 2797546 Y | 7/2006 |

(Continued)

OTHER PUBLICATIONS

Assa Abloy ICPT Product Materials, Assa Abloy, Nov. 2012.
C. Sharpe, Wireless Power Transfer for Access Control Applications, Access & Security, Jul. 17, 2017.

*Primary Examiner* — Edward Tso
(74) *Attorney, Agent, or Firm* — CanaanLaw, P.C.; David B. Ritchie (57) ABSTRACT

Example wireless power transfer systems and methods are described. In one implementation, a rechargeable battery is electrically coupled to an electronic lock module. An electronic control module that is physically separate from the electronic lock module generates a wireless charging link between the electronic control module and the electronic lock module. The electronic control module transmits a charging signal to the electronic lock module via the wireless charging link, and the electronic lock module uses this charging signal to charge the rechargeable battery. The transmission frequency of the charging signal can be varied over a predetermined frequency range by a numerically controlled oscillator.

39 Claims, 8 Drawing Sheets

(56) References Cited

U.S. PATENT DOCUMENTS

| | | |
|---|---|---|
| 8,551,163 B2 | 10/2013 | Aber et al. |
| 8,638,062 B2 | 1/2014 | Baarman et al. |
| 8,686,598 B2 | 4/2014 | Schatz et al. |
| 8,772,970 B2 | 7/2014 | Lambrou |
| 8,774,714 B2 | 7/2014 | Metivier |
| 8,805,530 B2 | 8/2014 | John |
| 8,825,173 B2 | 9/2014 | Forsell |
| 8,862,241 B2 | 10/2014 | Forsell |
| 8,901,775 B2 | 12/2014 | Armstrong et al. |
| 8,907,531 B2 | 12/2014 | Hall et al. |
| 9,089,717 B2 | 7/2015 | Forsell |
| 9,132,276 B2 | 9/2015 | Meskens |
| 9,290,966 B2 | 3/2016 | Hanchett, Jr. |
| 2004/0183652 A1 | 9/2004 | Deng et al. |
| 2007/0146115 A1 | 6/2007 | Roosli et al. |
| 2008/0300658 A1 | 12/2008 | Meskens |
| 2010/0179384 A1 | 7/2010 | Hoeg et al. |
| 2011/0195666 A1 | 8/2011 | Forsell |
| 2011/0227529 A1 | 9/2011 | Smith et al. |
| 2011/0311084 A1 | 12/2011 | Drader |
| 2012/0235502 A1 | 9/2012 | Kesler et al. |
| 2013/0214731 A1 | 8/2013 | Dinsmoor |
| 2013/0293025 A1 | 11/2013 | Xu et al. |
| 2013/0307474 A1 | 11/2013 | Shimura et al. |
| 2014/0136414 A1 | 5/2014 | Abhyanker |
| 2014/0197692 A1* | 7/2014 | Chen .................. G07C 9/00174 |
| | | 307/104 |
| 2014/0241555 A1 | 8/2014 | Terlizzi |
| 2014/0260459 A1 | 9/2014 | Nguyen et al. |
| 2014/0340032 A1 | 11/2014 | Curtis |
| 2015/0008761 A1 | 1/2015 | Kesler et al. |
| 2015/0048790 A1 | 2/2015 | Rudser et al. |
| 2016/0322847 A1 | 11/2016 | Geiszler |
| 2016/0322855 A1 | 11/2016 | Geiszler |
| 2017/0018956 A1* | 1/2017 | Geiszler .................. H02J 50/10 |

FOREIGN PATENT DOCUMENTS

| | | |
|---|---|---|
| CN | 102071838 B | 10/2012 |
| CN | 204103574 U | 1/2015 |
| DE | 3612761 A1 | 10/1987 |
| DE | 10206700 A1 | 8/2003 |
| EP | 2660785 A2 | 11/2013 |
| WO | 2000077330 A1 | 12/2000 |
| WO | 2002077399 A1 | 10/2002 |
| WO | 2005041385 A2 | 5/2005 |
| WO | 2006006834 A1 | 1/2006 |
| WO | 2008011657 A1 | 1/2008 |
| WO | WO 2008/011657 * | 1/2008 |
| WO | 2016175910 A1 | 11/2016 |

* cited by examiner

WIRELESSLY POWERED DOOR LOCK SYSTEMS AND METHODS

RELATED APPLICATIONS

This application is a continuation-in-part, and claims priority to Ser. No. 14/699,867, filed on Apr. 29, 2015, which is incorporated herein by reference in its entirety.

TECHNICAL FIELD

The present disclosure relates to systems and methods that wirelessly transmit electrical power across a physical gap.

BACKGROUND

In the field of wireless electronic systems powered by rechargeable batteries, there exists a need for a system that can recharge a rechargeable battery wirelessly, especially in the field of wireless electronic door locking systems. Typical electronic door locks are powered by battery packs that are bulky and disposable (i.e., not rechargeable). These battery packs typically need to be replaced periodically. Regular maintenance on these electronic door locks is therefore required to replace the disposable batteries.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein disclose an apparatus and methods that are configured to wirelessly recharge a rechargeable battery that is associated with, and powers, an electronic door locking system. The system consists of an electronic lock module attached to a door. The electronic lock module is electrically coupled to a rechargeable battery, which powers both the electronic lock module and an electronic door lock associated with the door. In an embodiment, an electronic control module is physically coupled (attached) to a door frame corresponding to the door. The electronic control module receives periodic input data from the electronic lock module, wherein the input data includes the status of the charge on the rechargeable battery. The electronic control module processes the data received from the electronic lock module and determines whether the charge on the rechargeable battery has fallen below a threshold value, wherein the threshold value is either a predetermined threshold value, or the threshold value is dynamically computed based on a plurality of variables that include but are not limited to the age of the battery, the temperature of the battery, the ambient temperature and the use rate. If the electronic control module determines that the charge on the rechargeable battery has fallen below the threshold value, the electronic control module wirelessly transmits a charging signal to the electronic lock module. The electronic lock module wirelessly receives this charging signal and uses this charging signal to charge the rechargeable battery, thereby eliminating the need for periodic inspection or maintenance of the door lock in order to replace or otherwise service the batteries in a disposable battery pack.

Figure 1:
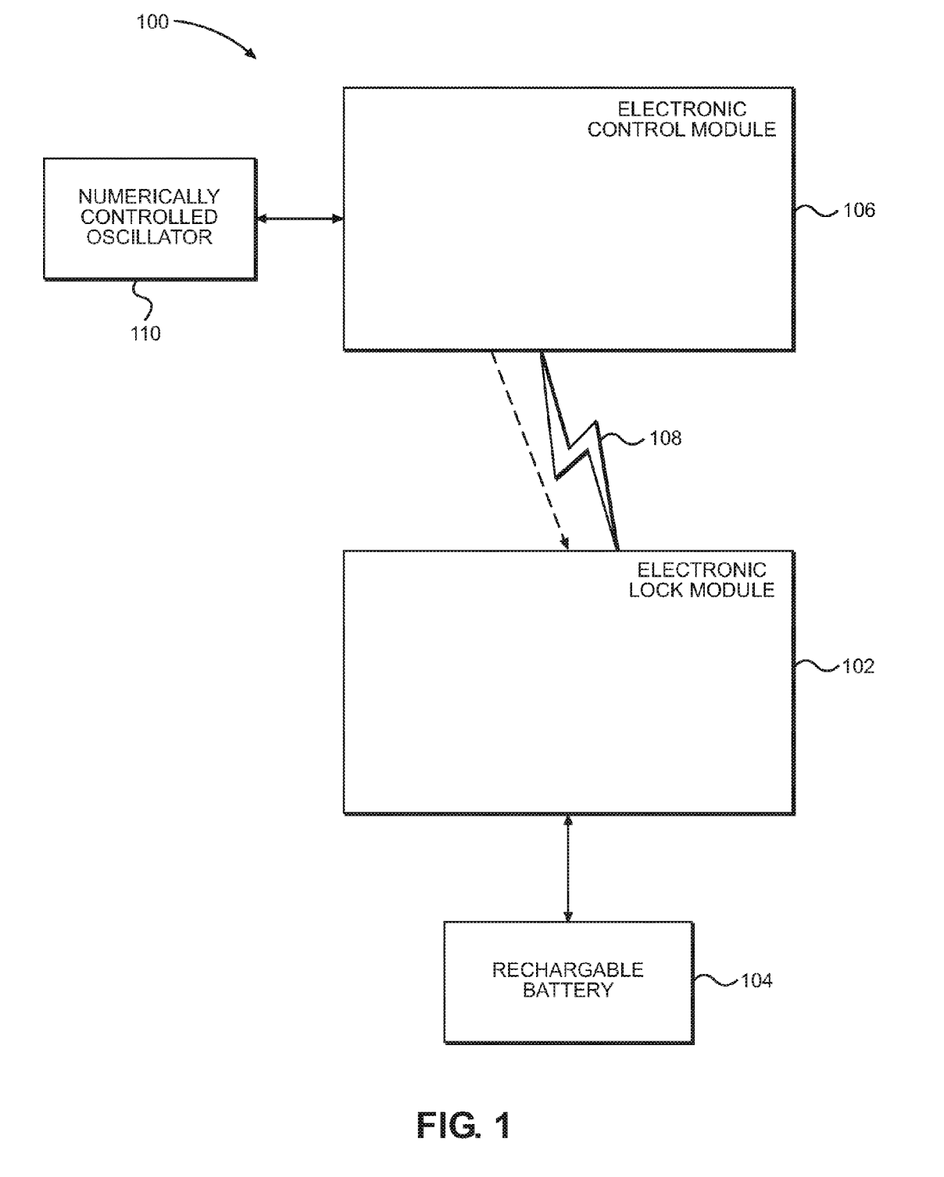
FIG. 1 represents a block diagram that shows an embodiment of a wireless battery charging system.

FIG. 1 represents a block diagram that shows an embodiment 100 of a wireless battery charging system. In this embodiment, the system is comprised of an electronic lock module 102 that may be associated with a door, and an electronic control module 106 that may be associated with a door frame associated with the door. In some embodiments, the electronic control module 106 is configured to generate a wireless charging link 108 between the electronic control module 106 and the electronic lock module 102, where the wireless charging link 108 is unidirectional. In some embodiments, the wireless charging link 108 may be an inductively-coupled link and the transmission frequency associated with the charging signal may be approximately 125 kHz. In other embodiments, the wireless charging link 108 may be an RF-coupled link.

The electronic control module 106 transmits a charging signal over the wireless charging link 108 to the electronic lock module 102. The electronic lock module 102 receives the charging signal and uses the charging signal to recharge a rechargeable battery 104 that is electrically coupled to electronic lock module 102. In alternate embodiments, battery 104 can be located within electronic lock module 102.

In some embodiments, the electronic control module 106 is associated with a numerically controlled oscillator (NCO) 110. The numerically controlled oscillator 110 is configured to input a signal to the electronic control module 106 so that the electronic control module can vary the transmission frequency of the charging signal over the wireless charging link 108 based on the input signal received from the numerically controlled oscillator 110. In alternate embodiments, numerically controlled oscillator 110 can be located in electronic control module 106.

Figure 2:
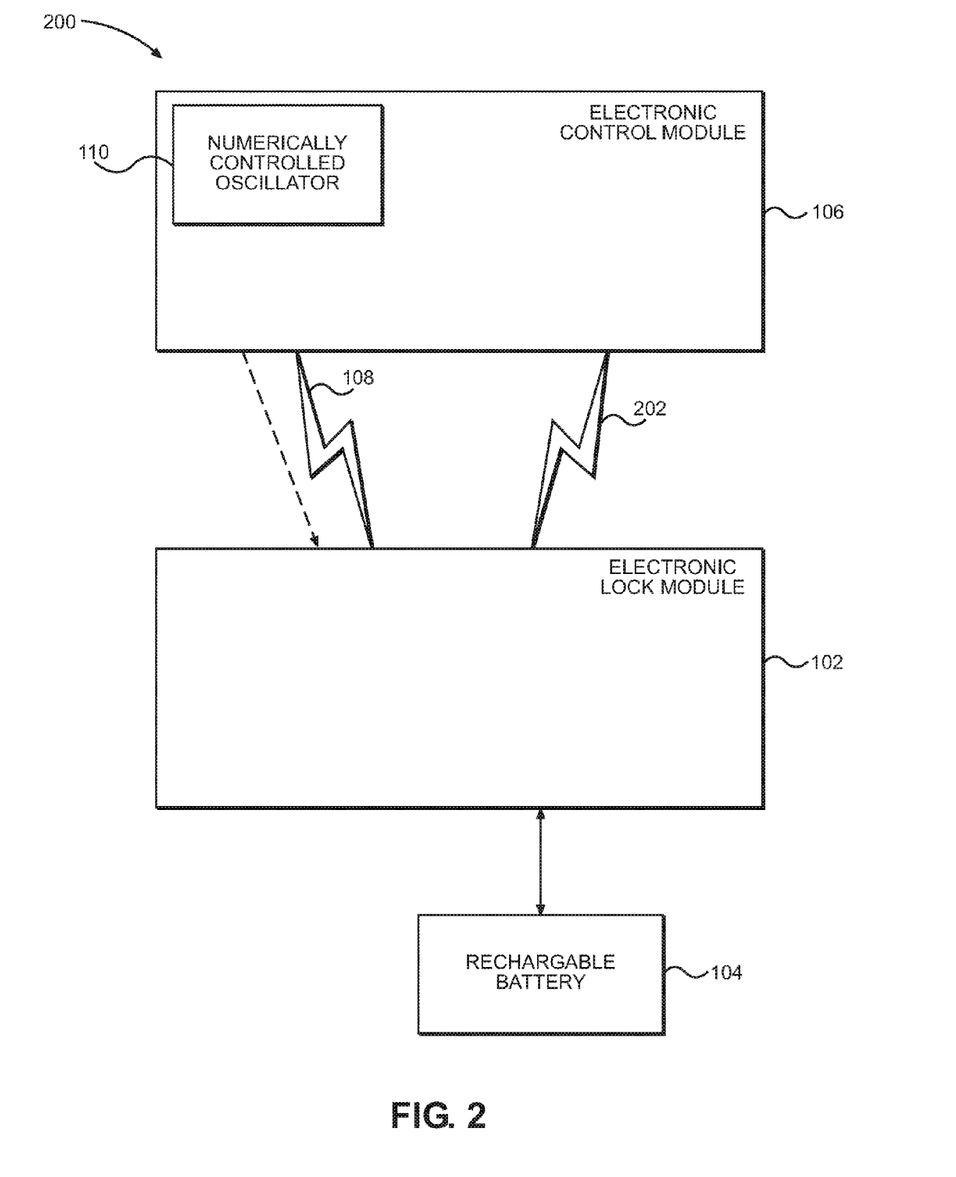
FIG. 2 represents a block diagram that shows another embodiment of the wireless battery charging system.

FIG. 2 represents a block diagram that shows another embodiment 200 of the wireless battery charging system. In some embodiments, wireless battery charging system 200 comprises electronic lock module 102 and electronic control module 106, where the electronic control module 106 is configured to generate a wireless charging link 108 between the electronic control module 106 and the electronic lock module 102, where the wireless charging link 108 is unidirectional. In some embodiments, the wireless charging link 108 may be an inductively-coupled link and the transmission frequency associated with the charging signal may be approximately 125 kHz. In other embodiments, the wireless charging link 108 may be an RF-coupled link. The electronic control module 106 transmits a charging signal over the unidirectional wireless charging link 108 to the electronic lock module 102. The electronic lock module 102 receives the charging signal and uses the charging signal to recharge a rechargeable battery 104. In some embodiments, the electronic lock module 102 is configured to generate a wireless communications link 202 between the electronic lock module 102 and the electronic control module 106. In some embodiments, the wireless communications link 202 may be an inductively coupled link with a transmission frequency of approximately 125 kHz. In other embodiments, the wireless communications link 202 may be an RF-coupled link with a transmission frequency of approximately 400 MHz. Wireless communications link 202 may be used, for example, to communicate information from the electronic lock module 102 to the electronic control module 106. In some embodiments, the information communicated from the electronic lock module 102 to the electronic control module 106 may include a measure of the power received by the electronic lock module 102 from the electronic control module 106 via the wireless charging link 108.

Electronic control module 106 may also include numerically controlled oscillator 110, where numerically controlled oscillator 110 is configured to vary the transmission frequency of the charging signal over the wireless charging link 108. In some embodiments, the electronic lock module 102 transmits a feedback signal to the electronic control module 106 over wireless communications link 202, where the feedback signal is a measure of the power of the charging signal received by the electronic lock module 102. In some embodiments, the numerically controlled oscillator 110 varies the transmission frequency of the charging signal over a range of values, and for each value of the transmission frequency, the electronic control module 106 receives a feedback signal from electronic lock module 102, and stores the associated value of the power of the charging signal as received by the electronic lock module 102. Once the entire transmission frequency range has been covered, the electronic control module 106 selects the transmission frequency associated with the maximum power of the charging signal as received by the electronic lock module 102, and transmits subsequent transmissions of the charging signal at the transmission frequency associated with the maximum power of the charging signal as received by the electronic lock module 102. In this way, maximum power coupling over the wireless charging link 108 associated with the charging signal is maintained. The advantage of transmitting the charging signal at the frequency at which maximum power transfer occurs is that it increases the efficiency of the battery charging system, allowing the maximum amount of power to be wirelessly coupled from the electronic control module 106 to the electronic lock module 102 via the wireless charging link 108. In some embodiments, this feature of determining transmission frequency associated with the maximum power of the charging signal as received by the electronic lock module 102 by varying the transmission frequency of the charging frequency over a range of values is referred to as "autotune."

Figure 3A:
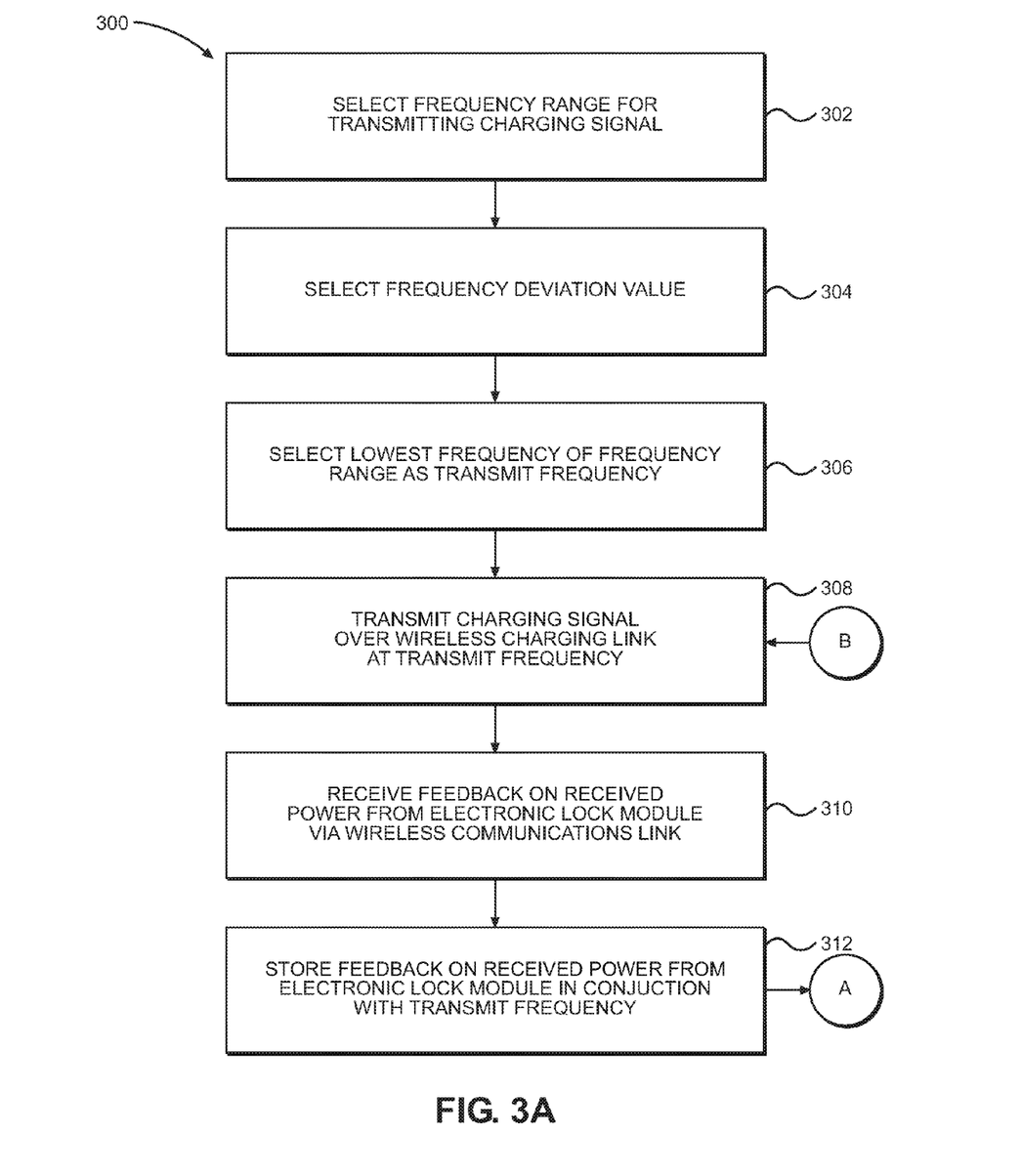
FIGS. 3A and 3B represent a flow diagram of a method that determines the transmission frequency at which maximum power transfer occurs across a wireless charging link.

FIG. 3A represents a flow diagram of a method 300 that determines the transmission frequency at which maximum power transfer occurs across a wireless charging link. At 302, the electronic control module selects a frequency range for transmitting the charging signal. In some embodiments where the wireless charging link is an inductively coupled charging link, the frequency range for transmitting the charging signal is selected to be in a range around the approximate resonance frequency of the inductively coupled wireless charging link. For example, in embodiments where the wireless charging link is an inductively coupled charging link, the transmission frequency has a nominal value of 125 kHz subject to autotuning, while the receiver is tuned to a frequency of 160 kHz. Next, at 304, the electronic control module selects a frequency deviation value. This frequency deviation value is used as a step to vary the transmission frequency for transmitting the charging signal over the transmission frequency range, and is selected based on parameters that include the number of frequency steps required by the system, the frequency resolution of the numerically controlled oscillator and so on. In some embodiments where the wireless charging link is an inductively coupled charging link, the frequency deviation value may be any value within a range of, for example, 10 Hz to 100 Hz. At 306, the electronic control module selects the lowest frequency of the frequency range as the transmission frequency, also known as the transmit frequency, and programs the numerically controlled oscillator to generate the charging signal at this transmission frequency. Next, at 308, the electronic control module transmits the charging signal over the wireless charging link at the transmit frequency. At 310, the electronic control module receives feedback from the electronic lock module regarding the received power, via the wireless communications link. At 312, the electronic control module stores the feedback on the received power from the electronic lock module in conjunction with the transmit frequency. The method then proceeds to A and continues to FIG. 3B as described below.

Figure 3B:
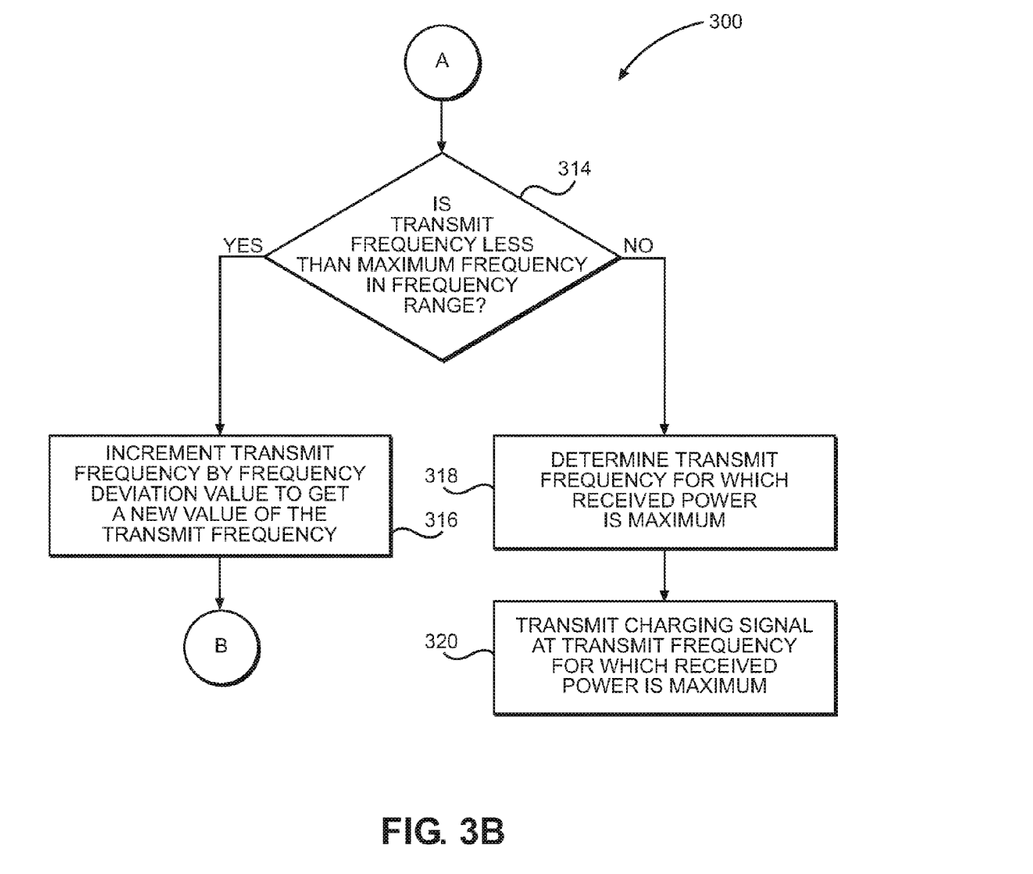

FIG. 3B is a continuation from FIG. 3A, of the method 300. Starting at A, the method proceeds to 314, where the electronic control module checks if the transmit frequency is less than the maximum frequency in the frequency range. If the transmit frequency is less than the maximum frequency in the frequency range, then the method proceeds to 316, where the electronic control module increments the transmit frequency by the frequency deviation value to get a new value of the transmit frequency. The method then goes to B, and back to 308, where the process continues. At 314, if the transmit frequency is not less than the maximum frequency in the frequency range, then the method proceeds to 318, where the electronic control module determines the transmit frequency for which the received power is maximum based on the stored feedback based on the power received by the electronic lock module. Finally, at 320, the electronic control module programs the numerically controlled oscillator to generate the transmit frequency for which the power received by the electronic lock module is maximum, and the electronic control module transmits the charging signal at the transmit frequency for which the received power is maximum.

As an alternative embodiment, the electronic control module may be configured to start at the highest frequency in the frequency range and use a negative value of the frequency deviation to decrement the transmit frequency at every step. In still other embodiments, the electronic control module may be configured to select between a positive value of the frequency deviation and a negative value of the frequency deviation, corresponding to either the process of starting at the lowest frequency in the frequency range or the process of starting at the highest frequency in the frequency range respectively.

Figure 4:
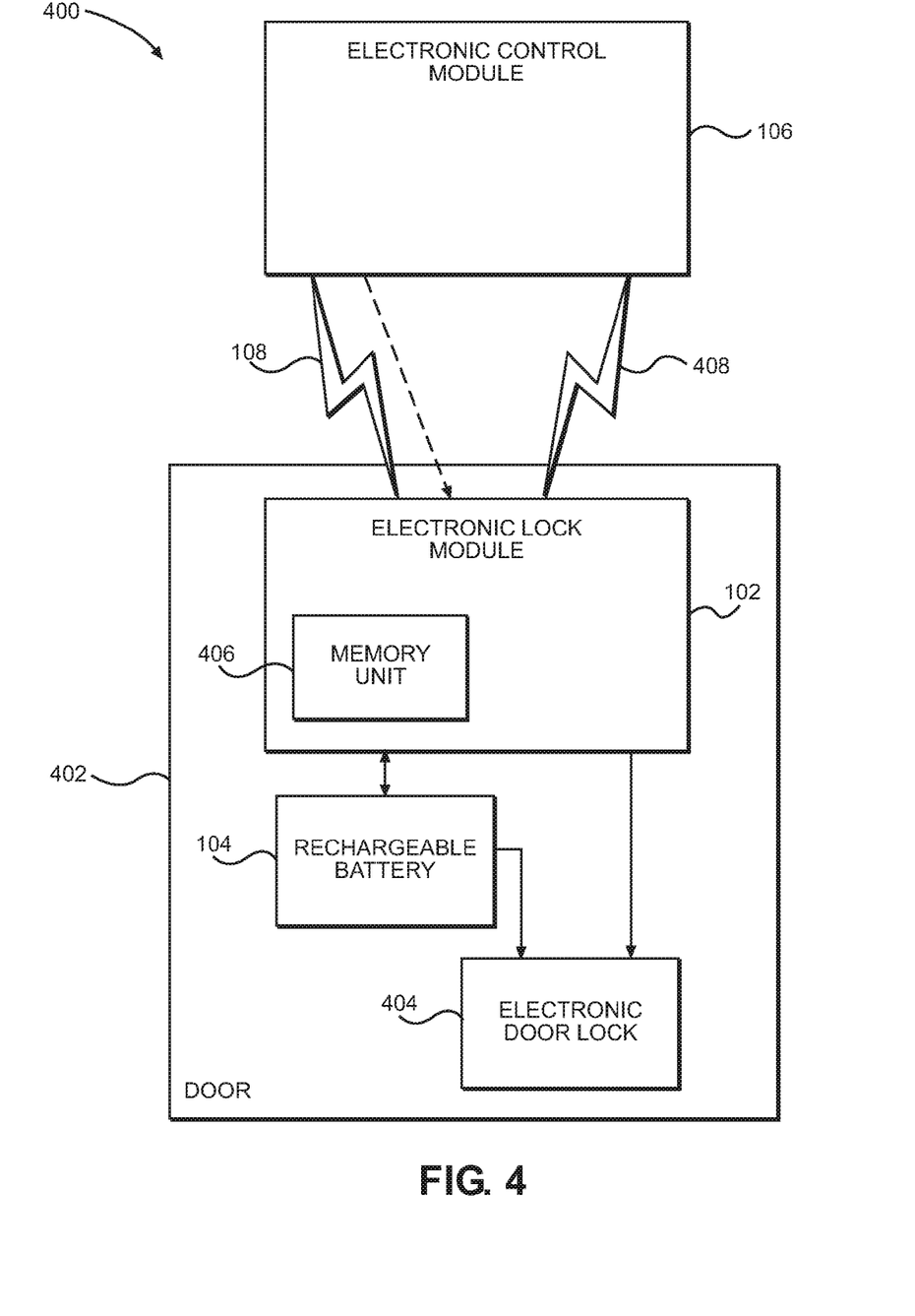
FIG. 4 represents a block diagram that depicts an embodiment of a wireless battery charging system that includes a memory unit.

FIG. 4 represents a block diagram 400 that depicts an embodiment of a wireless battery charging system that includes a memory unit. In some embodiments, electronic lock module 102 is disposed within a door 402. Electronic control module 106 transmits a wireless charging signal to the electronic lock module 102 via wireless charging link 108. In some embodiments, electronic control module 106 may be associated with a door frame (not shown), where the door frame is associated with door 402. A wireless communications link 408 is generated between electronic control module 106 and electronic lock module 102. In some embodiments, wireless communications link 408 is a bidirectional communications link, and may be an RF communications link at a frequency of 400 MHz.

The electronic lock module 102 receives the charging signal from the electronic control module 106 via the wireless charging link 108, and uses the charging signal to charge a rechargeable battery 104, also associated with door 402. The rechargeable battery 104 supplies power to an electronic door lock 404, where the electronic door lock can lock or unlock the door 402 based on commands from electronic lock module 102. In some embodiments, electronic lock module 102 includes a memory unit 406. Memory unit 406 may be used to store, for example, user authentication data for a designated set of users. In some embodiments, under normal operation, user authentication is provided by a remote host (also known as a host controller), and upon successful authentication, the electronic control module 106 transmits an authorization signal to the electronic lock module 102 via wireless communications link 408. Electronic lock module 102 uses the authorization signal to command the electronic door lock 404 to unlock the door to provide access to the user. In some embodiments, user authentication data stored in memory unit 406 may be used to provide failsafe access to the users whose data is stored in memory unit 406, in the event that the host controller is unable to provide successful authentication (for example, in the event of a power failure). Other cases where the user authentication data stored in memory unit 406 may be used to provide failsafe access to the users whose data is stored in memory unit 406 may include but are not limited to one or more of the following:

Failure of the communications link between the electronic control module 106 and the host controller.

Failure of the wireless charging link 108.

Failure of the wireless communications link 408.

A numeric keypad, radio frequency identification (RFID) reader or card reader (not shown) may be electrically coupled to the electronic lock module 102 and activated when, for example, the electronic lock module 102 does not receive any signal (such as a polling signal) over the wireless communications link 408 from the electronic control module 106 for a certain amount of time (which may indicate a power failure or a malfunction). In this case, an authorized user can either enter a numeric code on the numeric keypad or slide their access card and be granted access by the electronic lock module 102 based on the user authentication data stored in memory unit 406. Other user-related data stored in memory unit 406 includes but is not limited to the duration for which a user's credentials are valid, on what days of the week a user's credentials are valid, the security level of a particular user and so on.

Once the electronic control module 106 resumes transmitting signals to the electronic lock module 102, the system reverts back to its normal mode of operation, where the electronic lock module 102 relies on authentication confirmation signals from electronic control module 106 for user access.

Figure 5:
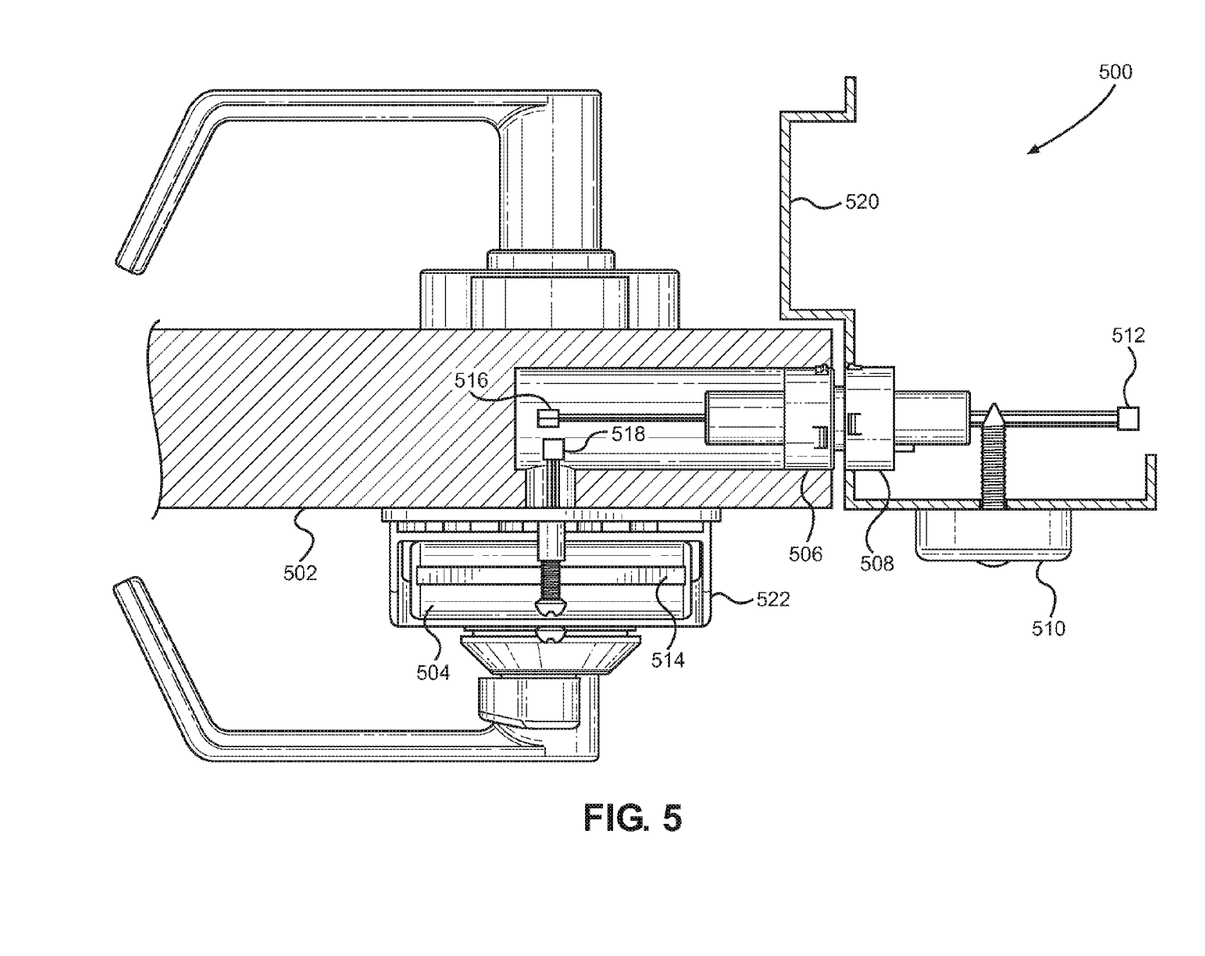
FIG. 5 depicts a view of an installation of the wireless battery charging unit within a door and the associated door frame.

FIG. 5 depicts a view 500 of an installation of the wireless battery charging unit within a door and the associated door frame. In some embodiments, the wireless charging link is a unidirectional inductively coupled link generated from a transmitter coil 508 disposed in a door frame 520, to a receiver coil 506 disposed in a door 502. In some embodiments, the maximum distance between the transmitter coil 508 and the receiver coil 506 is approximately 2 inches. If the distance between the transmitter coil 508 and the receiver coil 506 is greater than 2 inches, there may be a significant loss in the power coupled from the transmitter coil 508 to the receiver coil 506. This loss in power coupling can be used to determine whether the door is open. From a security standpoint, if the door is left open for greater than a specified amount of time, an alarm can be triggered based on the amount of time for which the loss in power coupling occurs. The loss in power coupling associated with an open door can also be used to implement a door contact, where the presence of maximum power coupling between the transmitter coil 508 and the receiver coil 506 can be used as a confirmation that the door is shut, eliminating the need to install a dedicated door switch for this purpose.

In some embodiments, the transmission frequency associated with the inductive coupling is approximately 125 kHz. FIG. 5 also illustrates a rechargeable battery 504 (corresponding to rechargeable battery 104), and an electronic circuit board 514 on which the necessary electronic components comprising the electronic lock module 102 are placed. In some embodiments, the electronic components placed on electronic circuit board 514 may include any combination of processors and memory units. In some embodiments, electronic circuit board 514 and rechargeable battery 504 may be disposed within an electronic door lock 522, corresponding to electronic door lock 404. In other embodiments, electronic circuit board 514 and rechargeable battery 504 may be disposed within the door 502. In some embodiments, the door 502 may be comprised of any one of wood, steel or aluminum. In the event that door 502 is a steel door, a hole of approximately ¾-inch diameter drilled into the door 502 may be used to install the receiver coil 506.

FIG. 5, illustrates an embodiment 510 of an electronic control module similar to electronic control module 106. An electrical connector 518 is configured to physically and electrically couple with an electrical connector 516. When electrical connector 518 and electrical connector 516 are connected, electrical power received by receiver coil 506 is transmitted to the electronic circuit board 514. An electrical connector 512 is configured to physically and electrically couple with a corresponding electrical connector (not shown) associated with electronic control module 510.

In some embodiments, the electronic circuit board 514 is configured to perform several functions including, but not limited to, routing the electrical power received to recharge rechargeable battery 504 and command the electronic door lock 522 to lock or unlock. In other embodiments, rechargeable battery may power either one or both of the electronic circuit board 514 and the electronic door lock 522.

Figure 6:
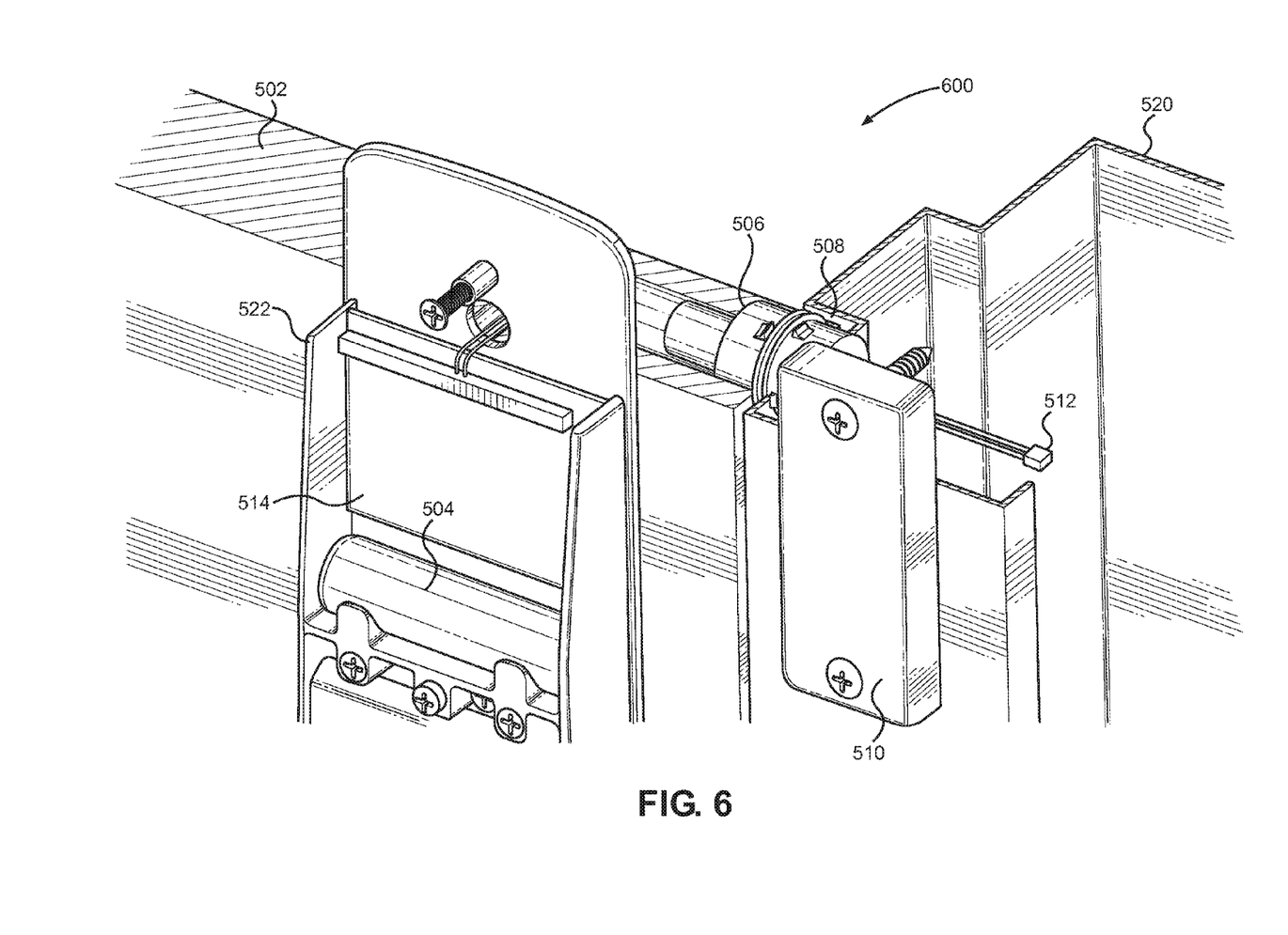
FIG. 6 depicts an alternate view of an installation of the wireless battery charging unit within a door and the associated door frame.

FIG. 6 depicts an alternate view 600 of an installation of the wireless battery charging unit within a door and the associated door frame. In some embodiments, the wireless charging link is a unidirectional inductively coupled link generated from transmitter coil 508 disposed in door frame 520, to receiver coil 506 disposed in door 502. In some embodiments, the maximum distance between the transmitter coil 508 and the receiver coil 506 is approximately 2 inches. In some embodiments, the transmission frequency associated with the inductive coupling is approximately 125 kHz. Also shown in this diagram are rechargeable battery 504 (corresponding to rechargeable battery 104), and electronic circuit board 514 on which the necessary electronic components comprising the electronic lock module 102 are placed. In some embodiments, the electronic components placed on electronic circuit board 514 may include any combination of processors and memory units. In some embodiments, electronic circuit board 514 and rechargeable battery 504 may be disposed within electronic door lock 522, corresponding to electronic door lock 404. In other embodiments, electronic circuit board 514 and rechargeable battery 504 may be disposed within the door 502.

FIG. 6 illustrates an embodiment 510 of the electronic control module similar to electronic control module 106. Electrical connector 512 is configured to physically and electrically couple with a corresponding electrical connector (not shown) associated with electronic control module 510.

Figure 7:
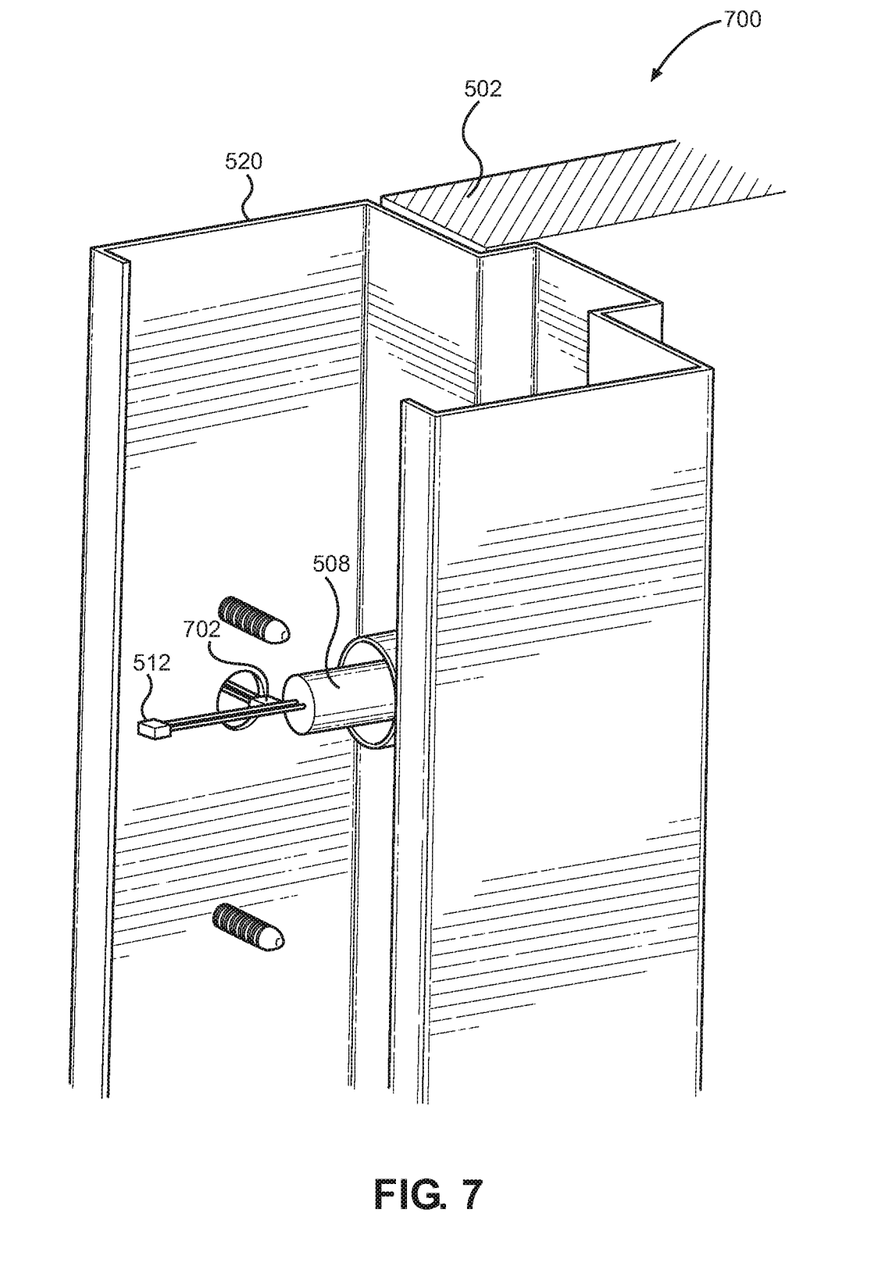
FIG. 7 depicts an alternate view of an installation of the wireless battery charging unit within a door and the associated door frame.

FIG. 7 depicts an alternate view 700 of an installation of the wireless battery charging unit within a door and the associated door frame. FIG. 7 shows transmitter coil 508 associated with door frame 520, where door frame 520 is associated with door 502. Electrical connector 512 is configured to physically and electrically couple with an electrical connector 702, wherein electrical connector 702 is electrically coupled to electronic control module 106.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:
1. An apparatus comprising:
an electronic lock module;
a rechargeable battery electrically coupled to the electronic lock module;
an electronic control module configured to generate a wireless charging link between the electronic control module and the electronic lock module,
wherein the electronic control module is configured to transmit a wireless charging signal to the electronic lock module via the wireless charging link, and
wherein the electronic lock module is configured to use the wireless charging signal to charge the rechargeable battery; and an adjustable oscillator configured to vary the transmission frequency of the wireless charging signal over a predetermined transmission frequency range.

2. The apparatus of claim 1, wherein the adjustable oscillator is configured to vary the transmission frequency of the charging signal to determine the transmission frequency at which maximum power transfer occurs across the wireless charging link.

3. The apparatus of claim 2, wherein the electronic control module is configured to transmit the charging signal at the transmission frequency at which maximum power transfer occurs across the wireless charging link.

4. The apparatus of claim 2, wherein the electronic lock module is configured to generate a wireless communications link between the electronic lock module and the electronic control module.

5. The apparatus of claim 4, wherein the electronic control module is configured to determine the transmission frequency at which maximum power transfer occurs across the wireless charging link based on a feedback signal transmitted from the electronic lock module to the electronic control module via the wireless communications link, and wherein the feedback signal is a measure of the power of the charging signal received by the electronic lock module over the wireless charging link.

6. The apparatus of claim 2 wherein the adjustable oscillator is a numerically controlled oscillator.

7. The apparatus of claim 1, wherein the adjustable oscillator is contained within the electronic control module.

8. The apparatus of claim 1, wherein the adjustable oscillator is coupled to the electronic control module.

9. The apparatus of claim 1 wherein the adjustable oscillator is a numerically controlled oscillator.

10. An apparatus comprising:
an electronic lock module;
a rechargeable battery electrically coupled to the electronic lock module;
an electronic control module configured to generate a wireless charging link between the electronic control module and the electronic lock module, wherein the electronic control module is configured to transmit a wireless charging signal to the electronic lock module via the wireless charging link, and wherein the electronic lock module is configured to use the wireless charging signal to charge the rechargeable battery;
an adjustable oscillator configured to vary a transmission frequency of the wireless charging signal over a predetermined transmission frequency range;
a memory unit electrically coupled to the electronic lock module and configured to store authentication data for designated users;
a bidirectional wireless communication link configured to couple the electronic control module and the electronic lock module; and
wherein the electronic lock module is configured to control a lock to cause it to be in a selected one of a locked state and an unlocked state.

11. The apparatus of claim 10, wherein the authentication data stored in the memory unit is configured to be used to provide authentication for designated users in the event that either one or both of the wireless charging link and the bidirectional wireless communication link fail.

12. The apparatus of claim 11, wherein the electronic lock module monitors the signal power received from the electronic control module via the wireless charging link.

13. The apparatus of claim 12, wherein the signal power is used to determine whether the door is open or closed.

14. The apparatus of claim 12, wherein the signal power is used to determine whether the door is open or closed and, based thereon, to provide a signal indicating whether the door is opened or closed.

15. The apparatus of claim 14 wherein the electronic control module is configured to to turn off the wireless charging link in response to the door being open.

16. The apparatus of claim 10, wherein the wireless charging link is an inductively coupled wireless charging link.

17. The apparatus of claim 16, wherein the inductively coupled wireless charging link is generated by a transmitter and a receiver that are inductively coupled.

18. The apparatus of claim 17, wherein the transmitter and receiver are tuned to approximately the same frequency.

19. The apparatus of claim 17, wherein the transmitter and the receiver are offset in frequency, wherein the frequency offset is less than or equal to 30 percent.

20. The apparatus of claim 17, wherein the transmitter and receiver are separated by a distance of 2 inches or less.

21. The apparatus of claim 20, wherein the electronic lock module is mounted within the door lock or within a housing covering the door lock.

22. The apparatus of claim 20, wherein the electronic lock module is mounted within a door.

23. The apparatus of claim 22, further comprising a door frame configured to support the door and to house the electronic control module.

24. The apparatus of claim 22, wherein the electronic lock module is mounted within a cylindrical cavity in the door.

25. The apparatus of claim 22, wherein the door comprises at least one of steel, aluminum, and wood.

26. The apparatus of claim 10 wherein the adjustable oscillator is a numerically controlled oscillator.

27. A method comprising:
generating a charging signal used to wirelessly charge a rechargeable battery;
varying, using an adjustable oscillator, a transmission frequency of the charging signal;
generating a feedback signal based on the power of the received charging signal;
transmitting, over a wireless communications link, the feedback signal;
receiving the feedback signal transmitted over the wireless communications link;
determining, using one or more received feedback signals, the transmission frequency of the charging signal at which the received power of the charging signal is maximum; and
transmitting the charging signal at the transmission frequency at which the received power of the charging signal is maximum.

28. The apparatus of claim 27 wherein the adjustable oscillator is a numerically controlled oscillator.

29. An apparatus, comprising:
an electronic lock module configured to be mounted to a door mounted in a door frame;
a rechargeable battery configured to be electrically coupled to power the electronic lock module;
an electronic control module configured to be mounted off of the door and physically separate from the electronic lock module,
wherein the electronic control module is configured to provide power to a wireless charging link between the electronic control module and the electronic lock module, wherein the electronic control module is configured to transmit a wireless charging signal from the electronic control module to the electronic lock module over the wireless charging link, and wherein the electronic lock module is configured to use the wireless charging signal to charge the rechargeable battery;

an adjustable oscillator configured to vary the transmission frequency of the wireless charging signal over a predetermined transmission frequency range;

a lock configured to be mounted to the door,
wherein the lock is coupled to the electronic lock module and configured to be set to a locked or an unlocked state by the electronic lock module; and a bi-directional data communications link configured to transmit data signals in a first direction from the electronic control module to the electronic lock module using a first electromagnetic signal having a first radio frequency, and in a second direction from the electronic lock module to the electronic control module using a second electromagnetic signal having a second radio frequency, wherein the second radio frequency is different from the first radio frequency.

30. The apparatus of claim 29, further comprising:
a first antenna configured to operate at the first frequency and electronically coupled to the electronic control module;
a second antenna configured to operate at the first frequency and electronically coupled to the electronic lock module;
a third antenna configured to operate at the second frequency and electronically coupled to the electronic control module; and
a fourth antenna configured to operate at the second frequency and electronically coupled to the electronic lock module.

31. The apparatus of claim 29, further comprising:
circuitry coupled to the rechargeable battery, the circuitry configured to monitor a state of charge of the rechargeable battery and cause the electronic lock module to request the electronic control module to provide a wireless charging signal over the wireless charging link.

32. The apparatus of claim 29 wherein the adjustable oscillator is a numerically controlled oscillator.

33. A method for controlling the lock state of a door mounted in a door frame, the door having a lock configured to be set to a locked state or an unlocked state, a lock control module configured to set the state of the lock to locked or unlocked, the lock control module electronically coupled to and powered by a rechargeable battery, the method comprising:

receiving a charging signal wirelessly over a wireless charging link from an electronic control module configured to be mounted off of the door and physically separate from the electronic lock module;

using the received charging signal to charge the rechargeable battery;

using a bi-directional data communications link configured to transmit
first data signals in a first direction from the electronic control module to the electronic lock module using a first electromagnetic signal having a first radio frequency, and
second data signals in a second direction from the electronic lock module to the electronic control module using a second electromagnetic signal having a second radio frequency, the second radio frequency being different from the first radio frequency; and
using an adjustable oscillator to vary a transmission frequency of the charging signal over a predetermined transmission frequency range.

34. The method of claim 33, wherein the first data signals include instructions to set the lock to an unlocked state.

35. The method of claim 33, wherein the second data signals include credential data received by the electronic lock module.

36. The method of claim 33, wherein the second data signals include a request to provide the charging signal.

37. The method of claim 33, wherein the second data signals include a request to cease providing the charging signal.

38. The method of claim 33, wherein the first data signals include instructions to set the lock to a locked state.

39. The apparatus of claim 33 wherein the adjustable oscillator is a numerically controlled oscillator.

* * * * *